United States Patent
Kliskey et al.

(10) Patent No.: US 9,457,620 B2
(45) Date of Patent: *Oct. 4, 2016

(54) ROLLER PLATFORM FOR TIRE INFLATION CAGE

(71) Applicant: Summit Tool Company, Akron, OH (US)

(72) Inventors: Roger Kliskey, Brimfield, OH (US); Rockford Tyson, Akron, OH (US)

(73) Assignee: SUMMIT TOOL COMPANY, Akron, OH (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/253,071

(22) Filed: Apr. 15, 2014

(65) Prior Publication Data
US 2014/0224429 A1    Aug. 14, 2014

Related U.S. Application Data

(63) Continuation of application No. 13/207,678, filed on Aug. 11, 2011, now Pat. No. 8,695,674.

(51) Int. Cl.
*B60B 30/02* (2006.01)
*B60C 25/14* (2006.01)

(52) U.S. Cl.
CPC ............. *B60B 30/02* (2013.01); *B60C 25/147* (2013.04); *B60B 2900/3313* (2013.01); *B60B 2900/3314* (2013.01)

(58) Field of Classification Search
CPC .......... B60B 30/02; B60B 2900/3313; B60B 2900/3314; B60C 25/147
USPC ............................................................ 157/1
See application file for complete search history.

(56) References Cited

U.S. PATENT DOCUMENTS

| | | | |
|---|---|---|---|
| 2,407,049 A * | 9/1946 | Winarsky | B60C 25/147 109/49.5 |
| 2,792,056 A | 5/1957 | Ricketts et al. | |
| 3,033,268 A * | 5/1962 | Schaevitz | B60C 25/132 157/1.26 |
| 3,630,260 A | 12/1971 | Bailey | |
| 3,648,752 A | 3/1972 | Benson | |
| 4,381,027 A | 4/1983 | Molen et al. | |
| 2005/0082013 A1* | 4/2005 | White | B60S 5/04 157/1 |

OTHER PUBLICATIONS

Ken-Tool Catalog KT0310, p. 36 (2010).

* cited by examiner

*Primary Examiner* — Hadi Shakeri
(74) *Attorney, Agent, or Firm* — Renner Kenner Greive Bobak Taylor & Weber

(57) ABSTRACT

A roller platform for use in a tire inflation cage includes a frame and at least one roller assembly and facilitates the rotation of a rim-wheel within the tire inflation cage. The roller platform includes a frame having members that are spaced so that the tire stop on a tire inflation cage fits between the frame members. The roller platform includes cross members that are spaced so that the cross members fit between adjacent bars of a tire inflation cage and so a bar fits between the cross members.

5 Claims, 6 Drawing Sheets

ROLLER PLATFORM FOR TIRE INFLATION CAGE

CROSS REFERENCE TO RELATED APPLICATIONS

This application is a continuation application of U.S. application Ser. No. 13/207,678, filed Aug. 11, 2011, the entirety of the disclosure of which is incorporated herein by reference.

TECHNICAL FIELD

The present invention generally relates to tire changing and related apparatus. More specifically, the present invention relates to cages in which tire and wheel assemblies are maintained, repaired, changed, or inflated. Even more specifically, the present invention relates to a roller platform that facilitates the rotation of a tire and wheel assembly in a tire inflation cage.

BACKGROUND

Servicing multi-piece and single-piece rim-wheels used on large vehicles such as trucks, tractors, trailers, buses and off road machines is generally regarded as dangerous work. Rim-wheels, whether multi-piece or single-piece, include an assembly of tire, tube, wheel components, and liner, where appropriate. Such rim-wheels are inflated to great pressure for use and improperly assembled or damaged rim-wheels have the potential to separate with violent force. Consequently, restraining devices have been developed that provide a barrier between the components of a rim-wheel and a person. Such restraining devices typically include a cage, rack, assembly of bars, or other components and constrain the rim-wheel in the case of an explosive separation or sudden release of air from the rim-wheel. These restraining devices, which are commonly referred to in the art as tire inflation cages, are in widespread use.

To position a rim-wheel within a tire inflation cage, a technician rolls an upstanding rim-wheel into the space defined within the bars of the cage. Tire inflation cages often include tire stops on the bottom that prevent the rim-wheel from rolling out of the cage once the rim-wheel is positioned so that a portion of the rim-wheel rests on the base of the cage between the tire stops. The tire stops are small enough to allow a technician to roll a rim-wheel over them as he positions the rim-wheel within the tire inflation cage, but large enough to prevent a wheel from rolling out of the cage, such as when it is unattended.

Once a rim-wheel is positioned in a tire inflation cage, it may need to be repositioned in order for the components of the rim-wheel to be accessible to the technician. In some instances, access to the rim-wheel's valve stem may be blocked by portions of the tire inflation cage, such as one of its bars. In such instances, the rim-wheel is rolled out of the tire inflation cage, moved around, and rolled back into the tire inflation cage with the intent that the valve stem or other component will then be accessible and not blocked by the cage. This approach is inexact, but is more manageable than lifting and manually rotating the rim-wheel, as they can be very heavy. In fact, rim-wheels are generally not rotatable once they are in a tire inflation cage because of the space constraints of the cage and the size and weight of the rim-wheel.

Thus, a need exists in the art for apparatus that can improve the efficiency of servicing rim-wheels in a tire inflation cage.

SUMMARY OF THE INVENTION

In light of the foregoing, it is a first aspect of the present invention to provide a roller platform for use in a tire inflation cage.

It is another aspect of the present invention to provide a roller platform for use in a tire inflation cage having a base and at least one tire stop on the base. The roller platform includes a frame and at least one roller assembly connected to the frame. The frame defines an opening for positioning the at least one tire stop therein.

Yet another aspect of the present invention is a roller platform for use in a tire inflation cage having a base, tire stops on the base, and a plurality of bars. The roller platform includes first and second frame members, first and second cross members connected to the first and second frame members, and at least one roller assembly connected to the first and second frame members. The first and second frame members are spaced a distance so that the tire stops can fit therebetween.

A further aspect of the present invention is a combination including a tire inflation cage and a roller platform. The tire inflation cage includes a base, tire stops on the base, and bars extending from the base. The roller platform is positioned on the base and includes a frame having members and at least one roller assembly connected to the frame. The tire stops on the base are situated between the members of the frame.

BRIEF DESCRIPTION OF THE DRAWINGS

This and other features and advantages of the present invention will become better understood with regard to the following description, appended claims, and accompanying drawings wherein:

DETAILED DESCRIPTION

Figure 1:
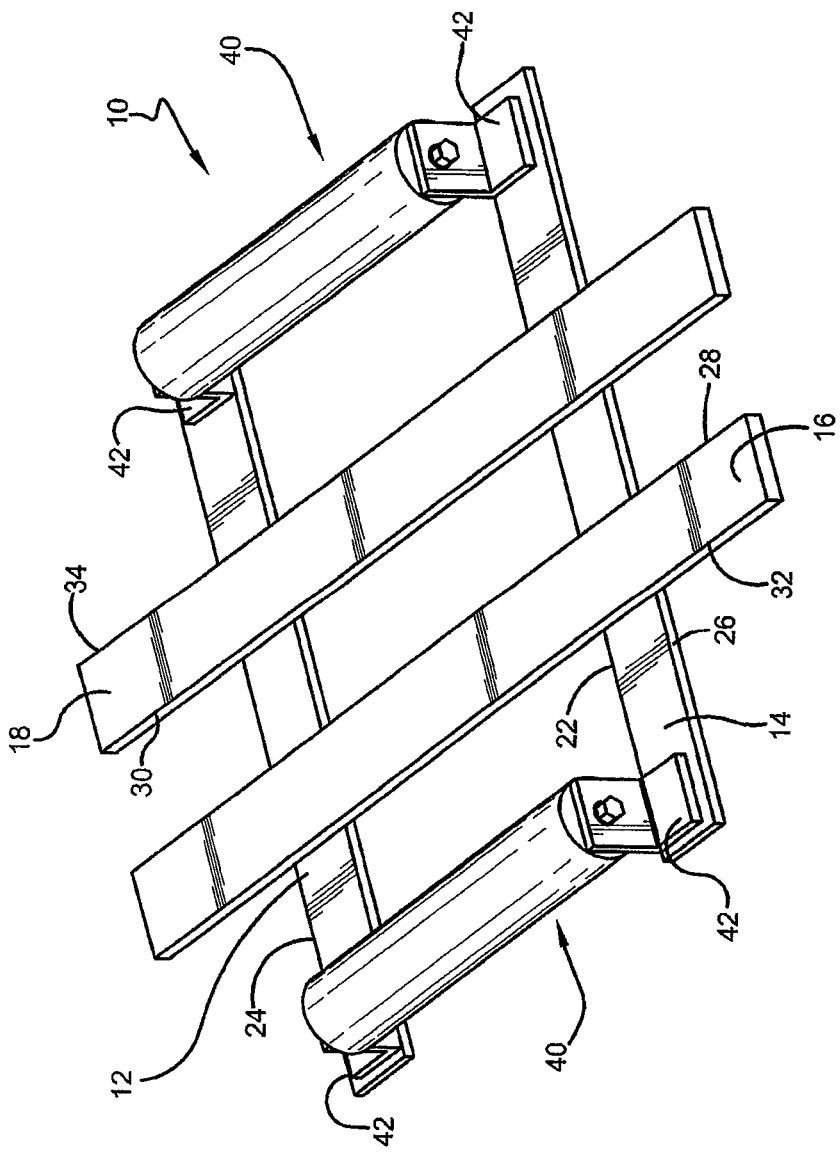
FIG. 1 is a perspective view showing a roller platform constructed according to the concepts of the present invention.

Referring to the figures, a roller platform for a tire inflation cage is shown and is generally indicated by the numeral 10. Roller platform 10 includes a frame 11 including first platform frame member 12, second platform frame member 14, first platform cross member 16, and second platform cross member 18. Each frame member 12, 14 is connected to both cross members 16, 18. Frame members 12, 14 and cross members 16, 18 are generally slab-shaped and have rectangular cross sections. Frame members 12, 14 are shown positioned on one side of cross members 16, 18, but this arrangement could also be different.

First platform frame member 12 and second platform frame member 14 have opposed inside edges 20, 22, respectively. First platform frame member 12 has an outside edge 24, and second platform frame member has an outside edge 26.

First platform cross member 16 and second platform cross member 18 have opposed inside edges 28, 30, respectively. First platform cross member 16 has an outside edge 32, and second platform cross member 18 has an outside edge 34.

Frame 11 defines one or more openings, including the openings between frame members 12, 14, between cross members 16, 18, between frame members 12 or 14 and cross members 16 or 18, and between any combination of frame members 12, 14 and cross members 16, 18.

One or more roller assemblies, such as roller assemblies 40, are attached to the roller platform frame 11. In the figures, roller assemblies 40 are attached to frame members 12, 14, such as by brackets 42. Roller assemblies 40 extend in the same general direction as cross members 16, 18. In the figures, roller assemblies 40 are attached near the ends of frame members 12, 14, but any suitable position may be used.

In general, the roller platform includes at least a frame and one roller assembly connected to the frame. The frame defines one or more openings for interacting with features of a tire inflation cage, as described more fully below.

Figure 2:
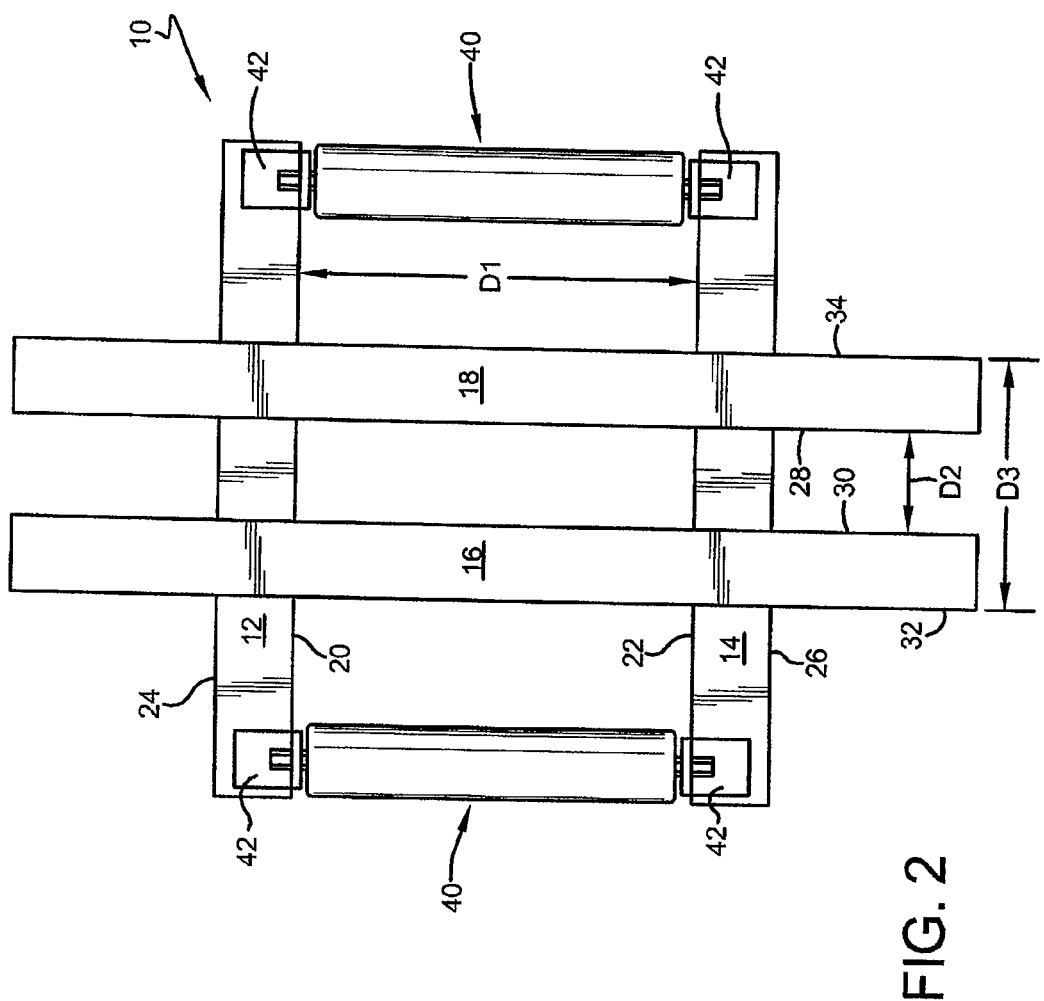
FIG. 2 is a top plan view of the roller platform of FIG. 1.

Referring to FIG. 2, the sizes and shapes of frame members 12, 14 and cross members 16, 18 define specific distances. D1 is the distance between the inside edges 20 and 22 of platform frame members 12, 14. D1 may be chosen to generally correspond with the size (length) of the tire stops that are commonly found in tire inflation cages.

D2 is the distance between the inside edges 28 and 30 of cross members 16, 18. D2 may be chosen to generally correspond with the diameter of a bar in a common tire inflation cage.

Finally, D3 is the distance between the outside edges 32 and 34 of cross members 16, 18. D3 may be chosen to generally correspond with the distance between adjacent bars on a common tire inflation cage.

While frame members 12, 14 and cross members 16, 18 are shown as having generally parallel edges, such is not necessarily required, so long as the roller platform can interact with a tire inflation cage as described more fully below.

Figure 3:
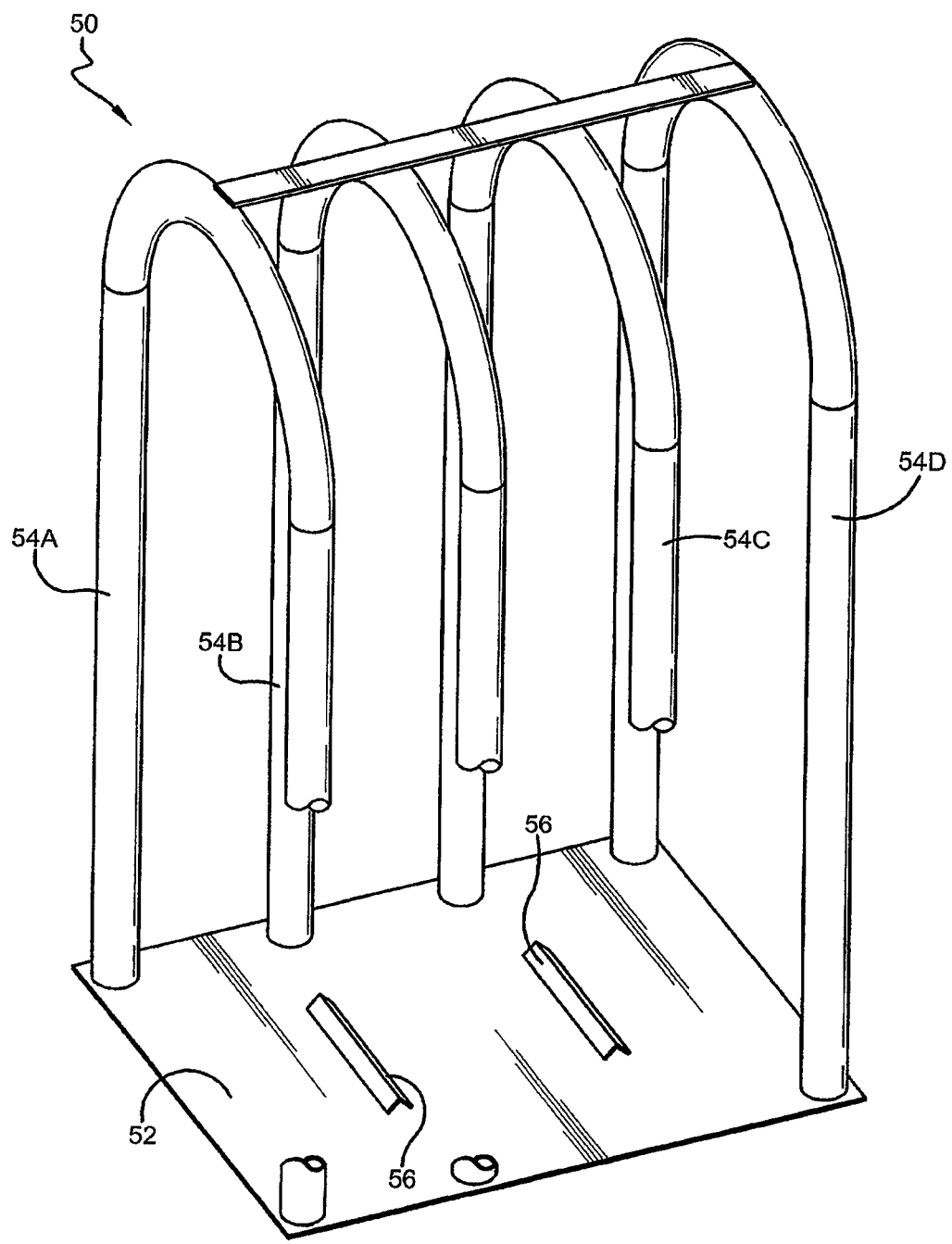
FIG. 3 is a fragmented view depicting a four-bar tire inflation cage, including tire stops on its base.

A tire inflation cage is shown in FIG. 3 and is generally indicated by the numeral 50. Tire inflation cage 50 includes a base 52, and four bars 54 (54A, 54B, 54C, and 54D). Each bar has upstanding portions that are connected at one end by an arcuate portion and at the other end to base 52. Bars 54 may have a diameter of 2¼ inches and be spaced 9½ inches apart, with 7¼ inches between adjacent bars. A space is defined within the bars 54 for servicing a rim-wheel. Tire stops for preventing a tire from rolling out of the cage are commonly included in tire inflation cages, and are indicated at numeral 56 in the figures. Tire stops 56 are generally centrally located on base 52 to provide an appropriate position for a rim-wheel to rest within cage 50. Tire stops 56 may be constructed of 1 inch×1 inch×⅛ inch angle iron, and can be 9⅞ inches long and 12 inches apart. Tire inflation cage 50 is designed to provide a barrier between a rim-wheel and a person.

Figure 4:
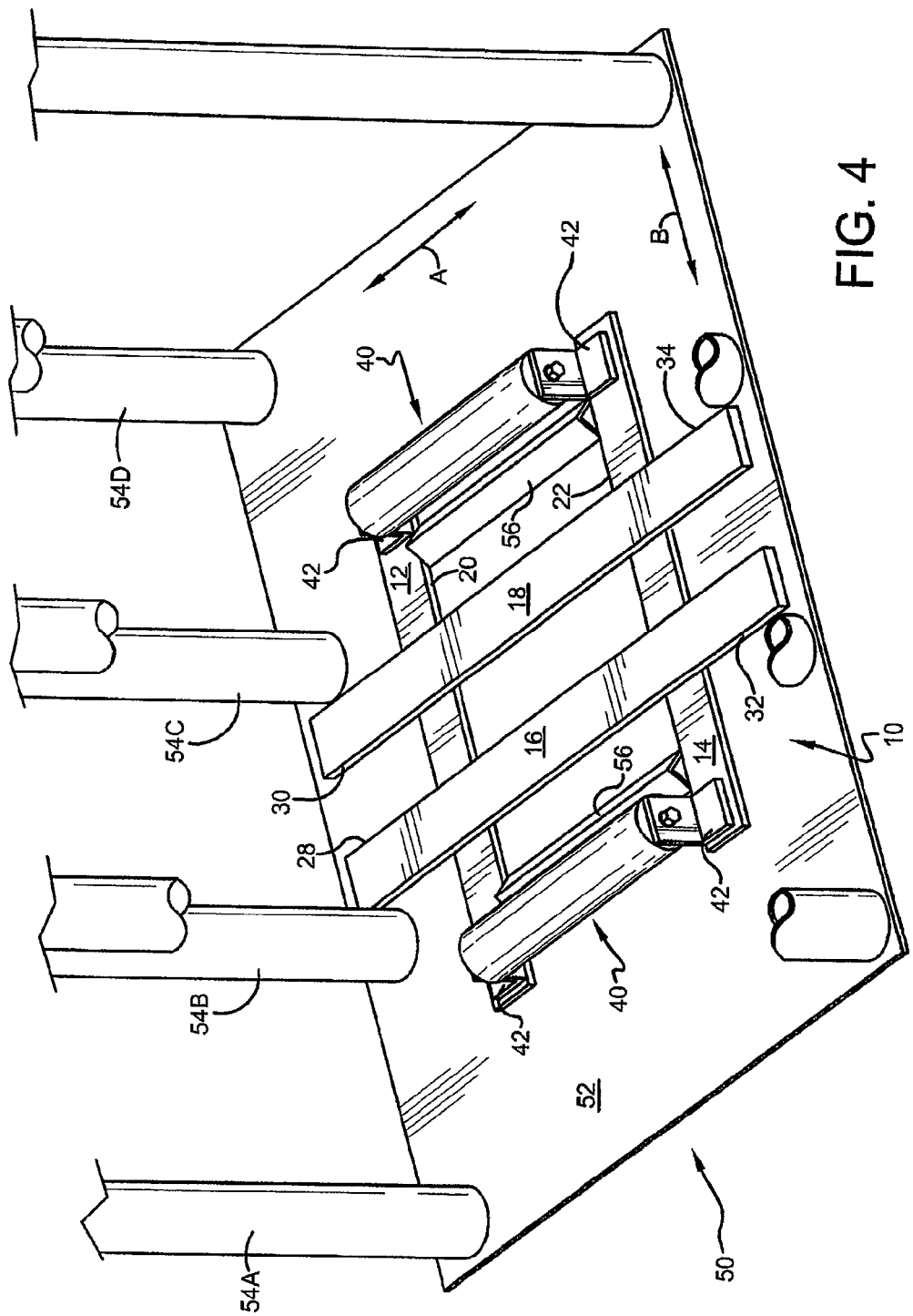
FIG. 4 depicts, in a fragmented view, a roller platform situated in the tire inflation cage of FIG. 3.

Turning to FIG. 4, roller platform 10 is shown situated in tire inflation cage 50. Frame members 12, 14 are proximate base 52, and roller assemblies 40 extend upward into the space defined within cage 50. Tire stops 56 fit neatly between the inside edges 20, 22 of the platform frame members 12, 14. The distance between inside edges 20, 22 is D1, and by choosing D1 appropriately, the interaction between roller platform 10, including the frame members 12, 14, and tire stops 56 can limit the movement of roller platform 10 within cage 50 in the direction of arrow A. Particularly, if D1 is chosen to be only slightly greater than the length of tire stops 56 (in the A direction), the tire stops 56 and inside edges 20, 22 of frame members 12, 14 will interact to keep roller platform relatively stationary in the A direction.

Also, the outside edges 32, 34 of cross members 16, 18 fit neatly between bars 54B and 54C. The distance between outside edges 32, 34 is D3, and by choosing D3 appropriately, the interaction between roller platform 10, including cross members 16, 18, and bars 54 can limit the movement of roller platform 10 within cage 50 in the direction of arrow B. Particularly, if D3 is chosen to be only slightly less than the distance between adjacent bars 54B, 54C (in the B direction), the bars 54B, 54C and outside edges 32, 34 of cross members 16, 18 will interact to keep roller platform relatively stationary in the B direction.

The tire stops 56 are positioned generally between cross members 16, 18 and roller assemblies 40, but other configurations are also possible.

Figure 5:
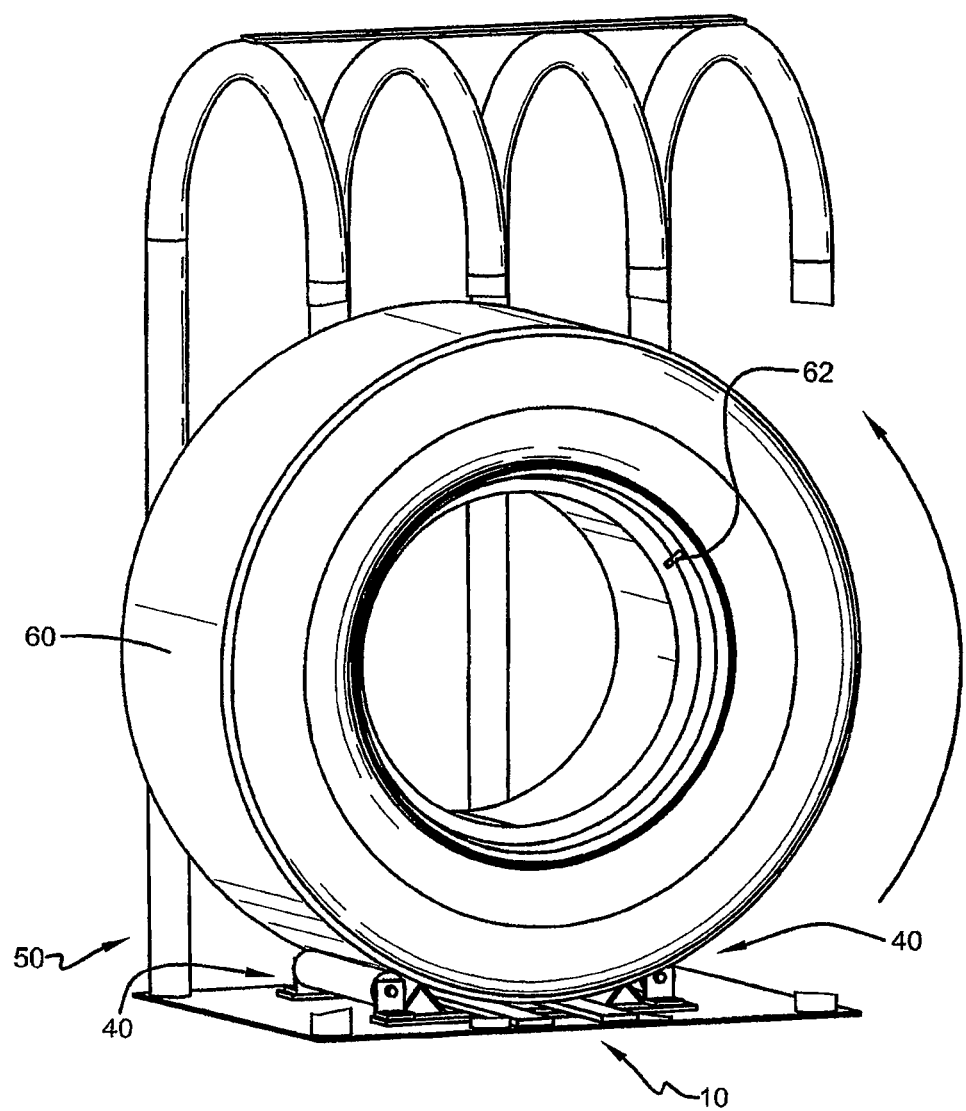
FIG. 5 depicts a fragmented view showing a tire inflation cage having a roller platform and a rim-wheel positioned on the roller platform.

A roller platform is useful within a tire inflation cage as follows. Again, as part of servicing a rim-wheel, a technician often uses a tire inflation cage to guard against the potential dangers in working on the rim-wheel. Referring to the tire inflation cage 50 having roller platform 10 situated therein (such as is shown in FIG. 4), the technician rolls the rim-wheel into cage 50 in the conventional manner. The rim-wheel is rolled up and over the first-encountered roller assembly 40, just as it was previously known to roll the rim-wheel over the tire stops. The rim-wheel is further moved into cage 50 until it generally rests between the two roller assemblies 40. In such a position, the rim-wheel is easily rotatable within cage 50, with one or both of the roller assemblies 40 facilitating the rotation of the rim-wheel. As shown in FIG. 5, a rim-wheel 60 within cage 50 and on roller platform 10 may be rotated to any desired position, such as to a position where its valve stem 62 is in an appropriate position for servicing. The counter-clockwise pointing arrow shows one possible rotation direction for rim-wheel 60.

The construction of roller platform 10, including the characteristics of roller assemblies 40 and brackets 42, may be chosen so that when a rim-wheel is positioned between the roller assemblies, the outer portion of the rim-wheel (tire tread) is completely supported above and does not touch the base 52 of cage 50, tire stops 56, or any of the roller platform members 12, 14, 16, 18. Or, platform 10 may be constructed so that the outer portion of the rim-wheel is partially supported by the roller assemblies 40 and is partially supported by whatever is between the roller assemblies (such as base 52, tire stops 56, or roller platform members 12, 14, 16, 18), so long as one or both of the roller assemblies 40 facilitate the rotation of the rim-wheel.

Figure 6:
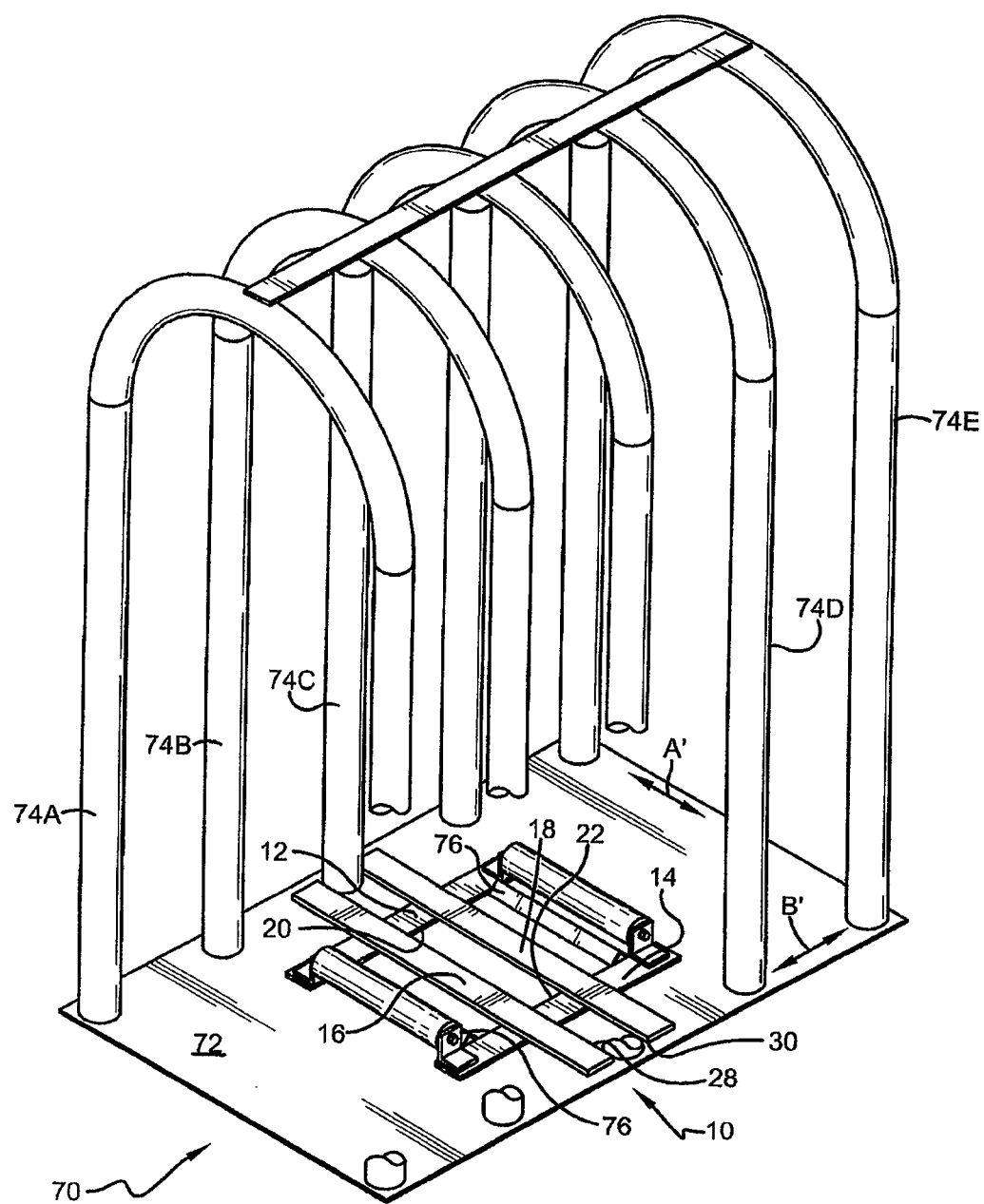
FIG. 6 depicts a tire inflation cage having five bars and a roller platform situated therein.

Turning to FIG. 6, roller platform 10 is also usable in a tire inflation cage having an odd number of bars. Unlike cage 50 in FIGS. 3-5 which has four bars on each side, the tire inflation cage 70 has five bars 74, including bars 74A, 74B, 74C, 74D, and 74E. Cage 70 includes tire stops 76, which are centrally located on a base 72. The characteristics of cage 70, including base 72, bars 74 and tire stops 76 can be the same as those described previously. Roller platform 10 is situated in cage 70 so that tire stops 76 fit between inside edges 20, 22 of frame members 12, 14. Again, the distance between inside edge 20, 22 is D1 and by choosing the characteristics of the roller platform accordingly, the interaction between the roller platform 10, including the frame members 12, 14, and tire stops 76 can limit the movement of the roller platform 10 in cage 70 in the direction of arrow A'.

Bar 74C fits between the inside edges 28, 30 of cross members 16, 18. This distance between inside edges 28, 30 is D2, and by choosing D2 appropriately, the interaction between roller platform 10, including cross members 16, 18, and one or more bars 74 can limit the movement of roller platform 10 within cage 70 in the direction of arrow B'. Particularly, if D2 is chosen to be only slightly greater than the diameter of bar 74C (or other extent in the B direction, if the bar does not have a circular cross-section), the bar 74C and inside edges 28, 30 of cross members 16, 18 will interact to keep roller platform relatively stationary in the B direction.

Given the parameters of the features of a tire inflation cage, such as its tire stops and bars, the characteristics of a roller platform (such as size and distance relationships) may be chosen to provide an appropriate fit for the roller platform within the tire inflation cage. The distances defined between the various portions of the frame and cross members of a roller platform may be selected so that the roller platform can be easily installed in and removed from an existing tire inflation cage, and also so that the movement of the roller platform, once in the cage, is minimized. In some embodiments, the interaction between the roller platform and the tire inflation cage essentially prevents movement of the roller platform once it is installed in the tire inflation cage. Of course, other arrangements are possible that allow a roller platform to be installed in a tire inflation cage.

In some embodiments, the distance D1 is less than one inch greater than the length of the tire stops. In other embodiments, D1 is less than one-half inch greater than the length of the tire stops, and in other embodiments, D1 is less than one-fourth inch greater than the length of the tire stops.

In some embodiments, the distance D2 is less than one inch greater than the diameter of a tire inflation cage bar. In other embodiments, D2 is less than one-half inch greater than the diameter of a bar, and in other embodiments, D2 is less than one-fourth inch greater than the diameter of a bar.

In some embodiments, the distance D3 is greater than one inch less than the distance between adjacent bars on a tire inflation cage. In other embodiments, D3 is greater than one-half inch less than the distance between adjacent bars, and in other embodiments, D3 is greater than one-fourth inch less than the distance between adjacent bars.

In one or more embodiments, D1 is between 9⅞ inches and 11 inches, D2 is between 2¼ inches and 3½ inches, and D3 is between 6¼ inches and 7¼ inches.

Moreover, the characteristics of the roller platform can be chosen to provide a roller platform that can be used on existing tire inflation cages, including cages having odd and even numbers of bars on each side. For that matter, a roller platform can be configured that will work on both cages having an even number of bars on each and cages having an odd number of bars on each side Variations on the disclosed roller platform will be apparent to interested technicians, and are intended to be within the scope of the present invention. For example, a roller platform could be constructed having only one roller assembly. Such an arrangement might still facilitate the rotation of a rim-wheel within a tire inflation cage. Also, structure could be provided on the roller platform so that the tire stops on the tire inflation cage interact with the roller platform in a way that limits the movement of the roller platform in both major directions of the tire inflation cage. Further, a single frame member having four fingers extending from its corners could be used, so that the frame member generally fits between the tire stops, and the tire stops fit between a portion of the frame member (between the fingers), such that the movement of the roller platform is limited in both major directions of the tire inflation cage. Roller platforms could also be constructed for tire inflation cages having one tire stop. And, different styles of roller assemblies than what are shown could be used. Generally, the roller platform includes at least a frame and at least one roller assembly, whatever form the frame and roller assembly may take, and the frame defines one or more openings so that the tire stops of a tire inflation cage fit in the one or more openings.

Roller platforms constructed according to the concepts of the present invention offer several advantages over the prior art. For one, the roller platforms are useful in tire inflation cages. Technicians previously needed to move a rim-wheel out of a tire inflation cage, move it around, and then re-position the rim-wheel into the tire cage in order to manipulate the position of features of the rim-wheel. Using the present invention, technicians may situate a rim-wheel within a tire inflation cage, and then rotate the rim-wheel to any desired position. This saves time and effort, and keeps the rim-wheel within the tire inflation cage, which may provide an improvement in safety. Also, the characteristics of the roller platform may be chosen so that it fits neatly with the components of an existing tire inflation cage. When size and distance relationships are appropriately chosen, the interaction of the roller platform with the tire inflation cage can limit the movement of the roller platform within the cage. Moreover, the roller platforms can work with tire inflation cages having an even number of bars per side, an odd number of bars per side, or both.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A roller platform for use in a tire inflation cage, the roller platform comprising:
    a frame including first and second frame members and first and second cross members, and
    two identical roller assemblies spaced apart and having first and second ends, wherein each first end is connected to first frame member and each second end is connected to said second frame member;
    wherein said first and second cross members are flat and have opposed inside edges and are disposed between the two roller assemblies,
    wherein the two roller assemblies extend from the first frame member to the second frame member in the same direction as the first and second cross members positioned between the two roller assemblies, and
    wherein said first and second cross members extend a distance beyond the first and second frame members.

2. The roller platform of claim 1, wherein said first and second frame members have ends, and wherein one of said two identical roller assemblies is connected near one end of said first and second frame members and the other of said two identical roller assemblies is connected near the other end of said first and second frame members.

3. A combination comprising:
a tire inflation cage including a base and two tire stops extending in a first direction on the base; and
a roller platform positioned on said base and including
a frame having first and second frame members extending in a second direction substantially perpendicular to said first direction, and first and second cross members extending substantially parallel to said first direction, both cross members connected to said first and second frame member; and
two identical roller assemblies connected to said first and second frame members and parallel to said first and second cross members,
wherein said cross members are disposed between the two roller assemblies and wherein said two tire stops on said base are positioned between said cross members of said frame and said roller assemblies, and wherein said two tire stops interact with the roller platform to limit movement of the roller platform.

4. The combination of claim 3, wherein the frame and roller assemblies of the roller platform define one or more openings, and wherein each tire stop is situated within one of the openings.

5. The combination of claim 3, wherein said roller platform is removable from said tire inflation cage.

* * * * *